April 27, 1937.  E. H. LAND  2,078,254
REFRACTING POLARIZING BODY
Filed March 10, 1930
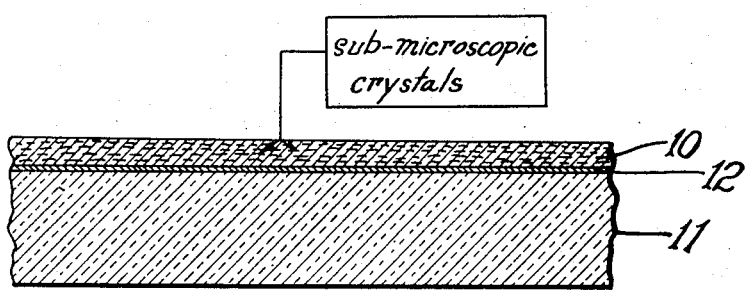
INVENTOR
Edwin H. Land
BY
Warfield, Drager & Brown
ATTORNEYS Patented Apr. 27, 1937

2,078,254

UNITED STATES PATENT OFFICE 2,078,254

REFRACTING POLARIZING BODY

Edwin H. Land, Cambridge, Mass., assignor to Sheet Polarizer Company, Inc., Union City, N. J., a corporation of New Jersey Application March 10, 1930, Serial No. 434,833

8 Claims. (Cl. 88—14)

This invention relates to polarizing bodies.

The invention has for its object generally, an improved polarizing body of the character indicated which accomplishes plane polarization of transmitted light with substantially a minimum of scattering and is convenient to manufacture.

More specifically, an object of the invention is to provide a polarizing body made from a body of transparent material having polarizing particles dispersed therein and oriented and retained therein with their polarizing axes in substantial parallelism, said particles being of such size that the polarizing body transmits light without showing appreciable scattering.

A further object is to provide an improved light-polarizing body which transmits light without showing appreciable scattering and which comprises viscous material containing minute polarizing particles disposed with their polarizing axes in substantial parallelism.

Other objects of the invention will in part be obvious and will in part appear hereinafter.

The invention accordingly comprises the product possessing the features, properties, and the relation of constituents, which are exemplified in the following detailed disclosure, and the scope of the application of which will be indicated in the claims.

For a fuller understanding of the nature and objects of the invention reference should be had to the following detailed description taken in connection with the accompanying drawing in which the figure is a fragmentary sectional view showing a section of a refracting polarizing body which has been flowed or otherwise deposited on a suitable support, all in a greatly enlarged scale and constructed in accordance with the present invention.

In the practice of the present invention a polarizing body is preferably made in the form of a film or ribbon by pouring a relatively viscous medium which contains a large mass of very small light polarizing bodies, such as dichroic transparent crystals dispersed throughout the menstruum which when set, retains the polarizing bodies in proper polarizing orientation. By pouring a viscous medium of this character, it is seen that the crystals dispersed therein irrespective of size, are subject to a mechanical field of force which orients the crystals. This mechanical field is that resulting from the differential action of the forces of cohesion and adhesion which act upon the crystals so as to turn their longest axis substantially parallel to the direction of flow. Dichroic transparent crystals of herapathite (sulphate of iodo-quinine) are suitable for this purpose, but it is desired that these crystals shall be substantially as small as possible, as by this, the scattering of transmitted light, is materially reduced. The preferred embodiment of the invention contemplates the use of minute, needle-like crystals whose width is preferably less than the wave lengths of light in the visible spectrum, for example whose width is preferably less than 400 millimicrons. Where such crystals are employed a microscopic examination of such a viscous medium when it has set, shows it to be homogeneous and clear, while substantially no scattering of transmitted light is detected.

In order to obtain films in ribbon form containing such crystals set in their polarizing position from a pouring operation, the medium employed should have substantially the maximum viscosity compatible with flow. Thus, smooth ribbons are obtained free from air bubbles and blemishes, the pouring operation being adapted to supply ribbon-like polarizing bodies rapidly and in substantially any quantity for commercial production.

A viscous medium adapted for pouring in accordance with the present invention, is readily prepared by adding to a suitable nitrocellulose solution, a jelly-like mass containing herapathite crystalline material. A highly saturated solution of herapathite-forming material suitable for providing this mass is preferably obtained by dissolving separately reacting agents which contain the constituents of herapathite in a hot alcohol, preferably hot methyl-alcohol. The following is an example of a procedure which may be followed to provide a suitable jelly-like mass:

Take 1.5 grams of quinine bi-sulphate and dissolve the same in 50 cc. of methyl-alcohol which is then brought to a boil and stirred, preferably with an iron rod. While being stirred, 0.525 gram of iodine as a 20% solution in alcohol, are added. By forming the solution of herapathite in this manner, the saturation is increased from 50 to 75 percent above normal. The stirring is continued while a gel forms, and until the mass has cooled. The stirring rapidly precipitates the herapathite as a jelly of interwoven needles of needle-like shape having a width not exceeding the wave lengths of light in the visible spectrum. When this is incorporated in viscous nitro-cellulose solution, the needles are readily distributed. The clots of jelly are gradually pulled apart, and the suspension finally appears perfectly clear.

A suitable nitro-cellulose solution to which the cool mass of herapathite is added, is one having a relatively high ratio of nitrocellulose to solvent, and may be made, for example, by dissolving a quantity of the finest grade of highly nitrated cotton in as little solvent as will dissolve it. A suitable solvent is amyl- or butyl-acetate. The solution of nitro-cellulose is highly adhesive and when the mass of herapathite is added, disrupts the plates into which the needle crystals of herapathite tend to gather. As a consequence, one thus produces a relatively highly dispersed mass in a viscous menstruum of nitro-cellulose, which, when poured from a bowl or plate, or otherwise subjected to flow, forms a ribbon-like sheet containing crystals which are quickly oriented so as to have their polarizing axes in substantial parallelism and which when set has the polarizing properties desired.

Commercial polarizing bodies may preferably be made in the form of a relatively thin sheet or film comprising the suspending medium and the minute particles dispersed therein. If desired, the polarizing body itself may be permanently or detachably fixed to a suitable support, preferably transparent, as for example, to a plate of glass or to a sheet of celluloid. Such a support may be desirable under certain conditions where it is found that the polarizing body itself may require some form of protection. In the drawing such a construction is shown. 10 denotes the polarizing body which is represented as a film of a transparent medium containing properly oriented particles of the desired character. As shown, this film is supported or superimposed upon any ordinary transparent body 11, which may be plate glass.

Where the polarizing body is poured or flowed on to the support in a still somewhat fluid condition, it may be desirable to interpose between the polarizing body and the support a layer of a transparent body 12 which may have preferably substantially the same viscosity as that of the polarizing body.

If the transparent body 12 is kept in fluid condition until the polarizing body has been deposited thereon, the entrapment of bubbles beneath the layer of the polarizing body may be avoided. Furthermore, the fluid layer 12 may serve to absorb and eliminate from the polarizing body marked variations in tension. This coating 12 may be of any suitable light-transmitting material, for example, a thin layer of fluid celluloid or dibutyl phthalate. It may, if desirable, be adhesive, serving to unite the polarizing body with the transparent support. This latter quality is not essential and the polarizing body may be permitted to set or harden while in contact with the coating 12 and later removed from contact therewith.

Throughout the specification and claims reference to a set suspending medium or to a hardened suspending medium will be understood as implying merely such a change in the characteristics of the medium as will prevent movement of the particles therein from their oriented positions. It will be further understood that while the suspending medium has been described as a cellulose or nitrocellulose in a solvent, this description has been intended to cover the dispersion of the nitrocellulose throughout the so-called solvent.

It is to be understood that any suitable cellulose or cellulosic material may be employed as the dispersing protective medium for the polarizing particles and other solvents or dispersing materials may be employed as the solvent or dispersion agent for the cellulose or cellulosic material, provided, however, that the said solvent should be a non-solvent for the polarizing particles carried in the suspending medium.

It is also to be understood that while herapathite is mentioned as the preferred material from which the polarizing particles are obtained, any suitable material of the same class may be used, as for example, periodides of the sulphates of cinchonine, cinchonidine or quinidine.

Since certain changes in carrying out the above process, and certain modifications in the composition which embody the invention may be made without departing from its scope, it is intended that all matter contained in the above description, shall be interpreted as illustrative and not in a limiting sense.

Having described my invention, what I claim as new and desire to secure by Letters Patent is:

1. A polarizing body comprising a set suspending medium of cellulosic material having polarizing particles dispersed therethrough, the polarizing axes of said particles being oriented and immovably retained by the suspending medium in substantial parallelism, said particles having one dimension not exceeding 400 millimicrons whereby the polarizing body transmits light without showing appreciable scattering.

2. A polarizing body comprising a set suspending medium of cellulosic material having particles of herapathite dispersed therethrough, the polarizing axes of said particles being oriented and immovably retained by the suspending medium in substantial parallelism, the width of said particles not exceeding 400 millimicrons, whereby the polarizing body transmits light without showing appreciable scattering.

3. A polarizing body comprising a set suspending medium of cellulosic material having asymmetric polarizing particles dispersed therethrough, the polarizing axes of said particles being oriented and immovably retained by the suspending medium in substantial parallelism, said particles being smaller in one dimension than the wave lengths of light in the visible spectrum, whereby the polarizing body transmits all light in the visible spectrum without showing appreciable scattering.

4. A polarizing body comprising a set suspending medium of nitrocellulose material having polarizing particles dispersed therethrough, the polarizing axes of said particles being oriented and immovably retained by the suspending medium in substantial parallelism, said particles being smaller in one dimension than the wave lengths of light in the visible spectrum, whereby the polarizing body transmits all light in the visible spectrum without showing appreciable scattering.

5. A polarizing body comprising a set suspending medium of nitrocellulose material having asymmetric particles of herapathite dispersed therethrough, said particles being less than 400 millimicrons in width, whereby said body transmits light without showing appreciable scattering, the polarizing axes of said particles being oriented and immovably retained by the suspending medium in substantial parallelism.

6. A polarizing body comprising a set suspending medium comprising cellulose or a cellulose derivative and a multitude of needle-like particles of herapathite dispersed therethrough and immovably embedded therein, said particles having their polarizing axes lying in substantial parallelism and being less than 400 millimicrons in width.

7. A polarizing body comprising a dispersed mass of polarizing particles immovably embedded in a set suspending medium with their polarizing axes oriented and retained in substantial parallelism, said particles having one dimension less than 400 millimicrons, whereby said body transmits light without showing appreciable scattering, the set suspension being adapted to retain its polarizing properties independent of external support.

8. A polarizing body comprising a light-transmitting set suspending medium having polarizing particles dispersed therethrough, the polarizing axes of said particles being oriented and immovably retained by the suspending medium in substantial parallelism, the particles being smaller in one dimension than the wave lengths of light in the visible spectrum and so many particles being employed that the body transmits light without showing appreciable scattering.

EDWIN H. LAND.